(12) United States Patent
Tzeng et al.

(10) Patent No.: US 6,912,604 B1
(45) Date of Patent: Jun. 28, 2005

(54) HOST CHANNEL ADAPTER HAVING PARTITIONED LINK LAYER SERVICES FOR AN INFINIBAND SERVER SYSTEM

(75) Inventors: Shr-Jie Tzeng, Fremont, CA (US);
Bahadir Erimli, Campbell, CA (US);
Yatin Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 815 days.

(21) Appl. No.: 09/816,407

(22) Filed: Mar. 26, 2001

(51) Int. Cl.[7] .............................................. G06F 3/00
(52) U.S. Cl. ........................ 710/52; 710/39; 710/54; 710/112; 710/310; 370/412; 370/429
(58) Field of Search ................................ 710/39, 52–57, 710/112, 310; 370/412, 429, 395

(56) References Cited

U.S. PATENT DOCUMENTS

| | | | |
|---|---|---|---|
| 6,526,057 B1 * | 2/2003 | Lee | 370/395.42 |
| 6,600,735 B1 * | 7/2003 | Iwama et al. | 370/352 |
| 6,704,321 B1 * | 3/2004 | Kamiya | 370/412 |

OTHER PUBLICATIONS

Daniel Cassiday, "InfiniBand™ Architecture Tutorial" Hot Chips, Aug. 2000, Sun Microsystems, 79 pages.

* cited by examiner

Primary Examiner—Jeffrey Gaffin
Assistant Examiner—Mike Nguyen
(74) Attorney, Agent, or Firm—Manelli Denison & Selter PLLC; Leon R. Turkevich; Edward J Stemberger

(57) ABSTRACT

A host channel adapter configured for outputting packets according to InfiniBand™ protocol is implemented using partitioned link modules configured for performing selected link operations prior to outputting the packets. A pre-link module is configured for ordering work queue entries in an order based on determined service level and virtual lane priorities. The pre-link module outputs the ordered work queue entries to a transport service module configured for generating a transport layer header for the packets based on the respective work queue entries. Once the transport layer headers have been generated, a post-link module is configured for retrieval of the transport layer header and transport data and preparing the transmit data packets for transmission on the network by constructing the link layer fields. The post-link module outputs the transmit data packets based on the ordering and the flow control protocol for the appropriate virtual lanes.

14 Claims, 2 Drawing Sheets

HOST CHANNEL ADAPTER HAVING PARTITIONED LINK LAYER SERVICES FOR AN INFINIBAND SERVER SYSTEM

BACKGROUND OF THE INVENTION

1. Field of the Invention

The present invention relates to a host channel adapter configured for communication with target channel adapters in an InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, accessibility, and serviceability.

In addition, processors used in servers have encountered substantial improvements, where the microprocessor speed and bandwidth have exceeded the capacity of the connected input/out (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between central processing units, peripherals, and switches inside a server system. Hence, the term "InfiniBand™ network" refers to a network within a server system. The InfiniBand™ Architecture Specification specifies both I/O operations and interprocessor communications (IPC).

A particular feature of InfiniBand™ Arcluitecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading"), hence offloading the operating system of the server system.

The InfiniBand™ Architecture Specification describes a network architecture, illustrated in FIG. 1. The network 10 includes channel adapters 12 and 14, processor nodes 16, peripherals 18 such as Ethernet bridges or storage devices, routers 20, and InfiniBand™ switches 22. Channel adapters operate as interface devices for respective server subsystems. For example, host channel adapters (HCAs) 12 are used to provide processor nodes 16 with an interface connection to the InfiniBand™ network 10, and target channel adapters (TCAs) 14 are used to provide the peripherals 18 with an interface connection to the InfiniBand™ network. Host channel adapters 12 may be connected to a memory controller 24 as illustrated in FIG. 1. Host channel adapters 12 implement the transport layer using a virtual interface referred to as the "verbs" layer that defines in the manner in which the processor 16 and the operating system communicate with the associated HCA 12: verbs are data structures (e.g., commands) used by application software to communicate with the HCA. Target channel adapters 14, however, lack the verbs layer, and hence communicate with their respective devices 18 according to the respective device protocol (e.g., PCI, SCSI, etc.).

The InfiniBand™ Architecture Specification requires that a packet to be sent via an HCA 12 undergoes transport layer service, followed by link layer service. Examples of operations performed during transport layer service include constructing a transport layer header, generating a packet sequence number, validating service type, etc. Examples of operations performed during link layer service include service layer and virtual layer mapping (SL-VL mapping), link layer flow control packet generation, link layer transmission credit checking, etc.

However, there does not yet exist actual hardware implementations of the InfiniBand™ devices, hence arbitrary hardware implementations may result in substantially costly hardware designs. For example, conventional approaches to implementing transport layer and link layer services in hardware may necessitate substantially large memories, and substantial waste of processing-intensive resources, for example if an HCA 12 performs substantial transport layer processing on a low priority packet.

SUMMARY OF THE INVENTION

There is a need for an arrangement that enables a host channel adapter to be implemented in an efficient and economical manner.

There also is a need for an arrangement that enables a host channel adapter to be implemented with sufficient flexibility that embedded processor operations can be added without compromising HCA performance.

These and other needs are attained by the present invention, where a host channel adapter configured for outputting packets according to InfiniBand™ protocol is implemented using partitioned link modules configured for performing selected link operations prior to outputting the packets. A pre-link module is configured for ordering work queue entries in an order based on determined priorities. The pre-link module outputs the ordered work queue entries to a transport service module configured for generating a transport layer header for the packets based on the respective work queue entries. Once the transport layer headers have been generated, a post-link module is configured for preparing the data packets for transmission on the network.

One aspect of the present invention provides a method. The method includes determining an order of received work queue entries based on respective service levels, and outputting the received work queue entries according to the determined order. The method also includes generating, in a transport service module for each of the received work queue entries according to the determined order, a corresponding transport layer header for corresponding transport data specified by each of the received work queue entries. Transmit packets are generated in the determined order and having the respective transport layer headers, and each of the transmit packets based on the determined order.

Another aspect of the present invention provides a host channel adapter comprising a pre-link module, a transport service module, and a post-link module. The pre-link module is configured for determining an order of received work queue entries based on respective service levels, the pre-link module outputting the received work queue entries according to the determined order. The transport service module is configured for generating transport layer headers for the work queue entries output from the pre-link module according to the determined order, and the post-link module is configured for generating, in the determined order, transmit packets having the respective transport layer headers for output onto a network.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
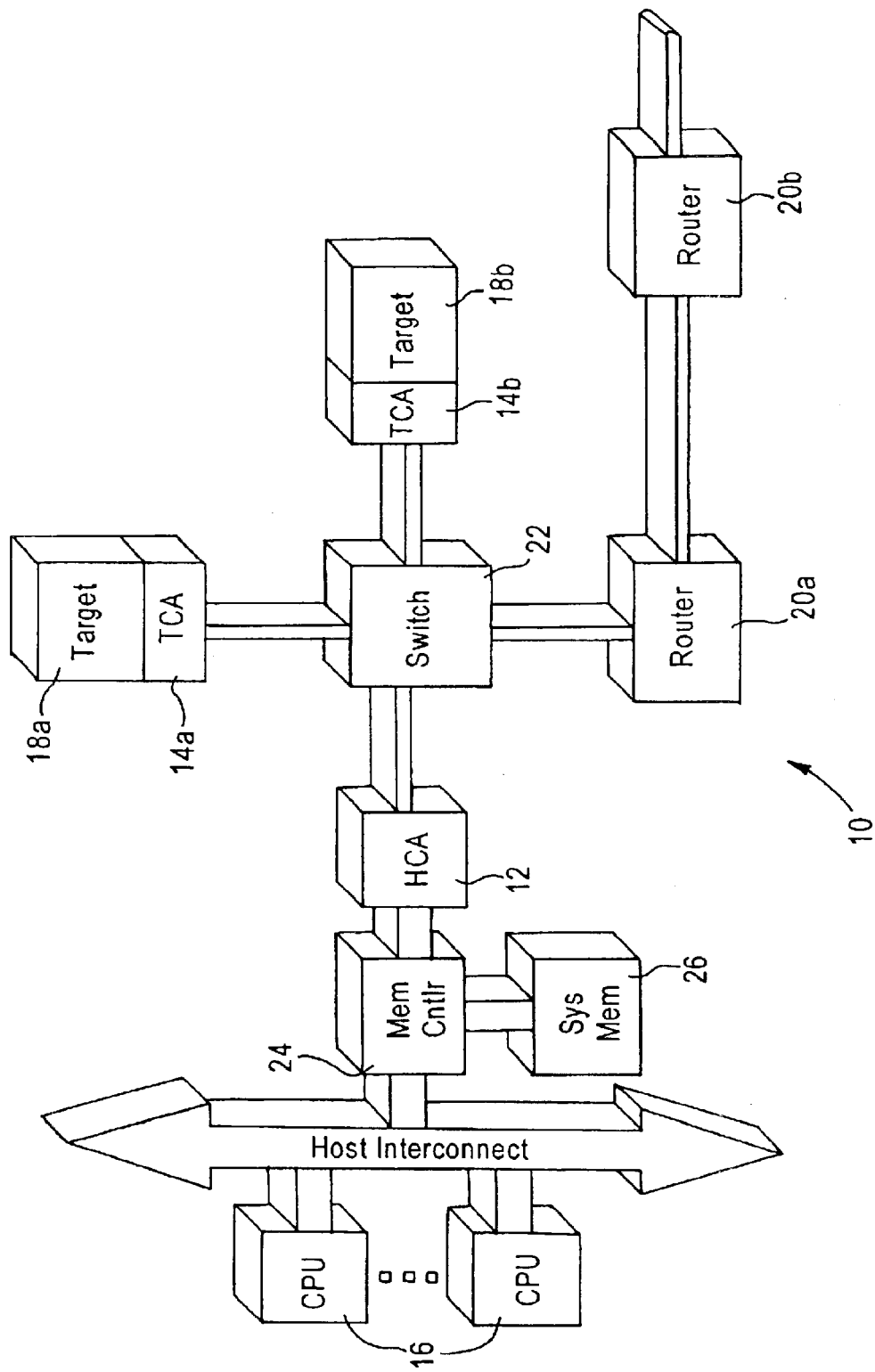
FIG. 1 is a block diagram illustrating a conventional network according to the InfiniBand™ Architecture Specification.
Figure 2:
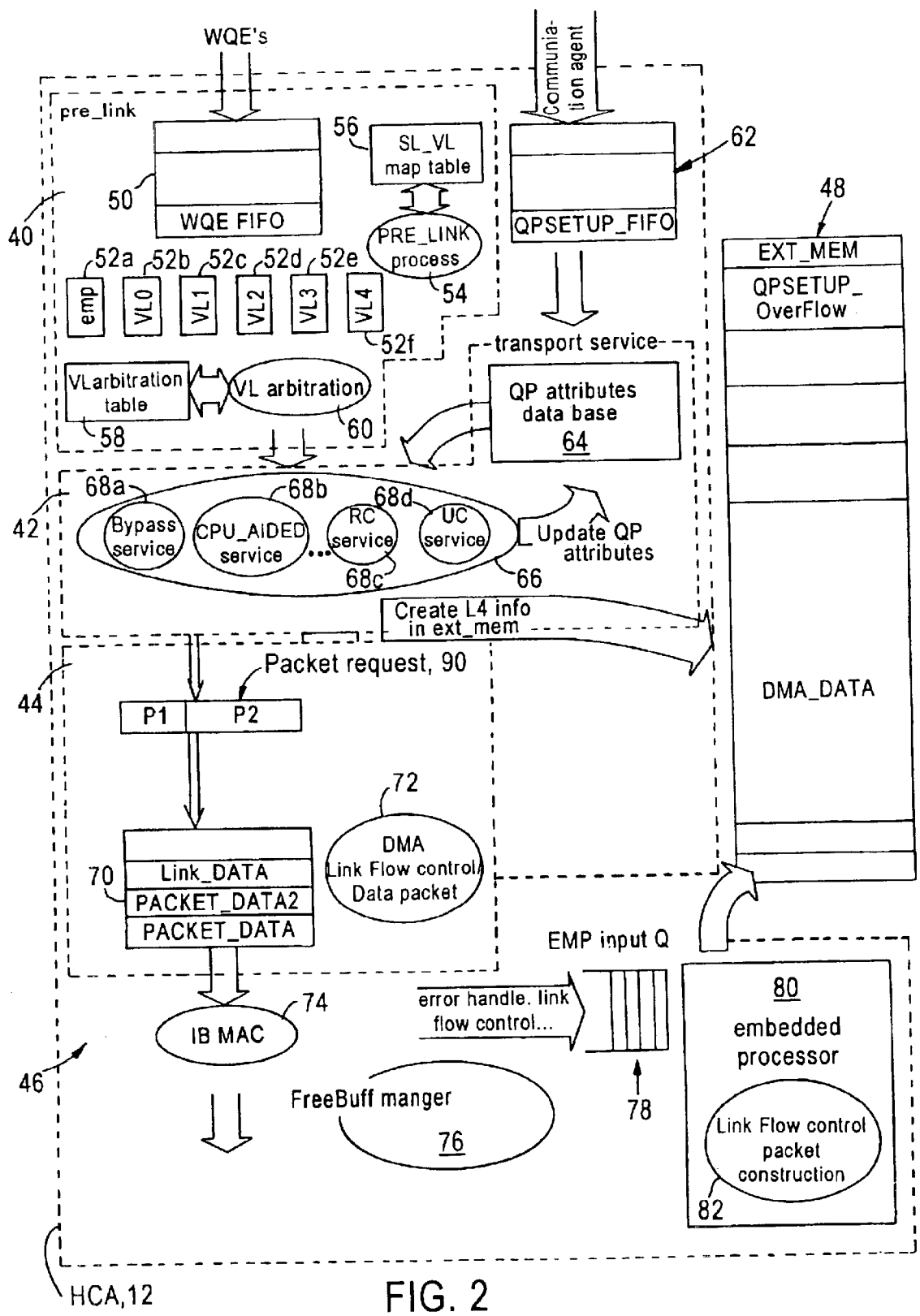
FIG. 2 is a diagram illustrating a host channel adapter configured for generating transmit packets according to an embodiment of the present invention.

FIG. 2 is a block diagram illustrating a host channel adapter (HCA) 12 configured for generating and outputting transmitting packets according to an embodiment of the present invention. The HCA 12, compliant with the Infini-Band™ Architecture Specification, is implemented in a manner that ensures that hardware resources are efficiently utilized by generating transmit packets according to a priority-based ordering. In addition, the disclosed HCA 12 provides flexibility by enabling embedded processes to be added without disruption of traffic flow. Hence, the HCA 12 can be implemented in an economical manner with mal complexity relative to conventional implementation techniques.

One problem with conventional arrangements for implementing the HCA 12 according to the InfiniBand™ Architecture Specification is that transport layer service would be performed first, for example by constructing a transport layer header, generating a packet sequence number, validating the service type (e.g., reliable connection, reliable datagram, unreliable connection, unreliable datagram, etc.), and other transport layer operations. Once the transport layer operations have been completed, the packet would be sent to the link layer service for link layer operations, including service layer and virtual lane mapping, link layer flow control packet generation, link layer transmission credit checking, and other operations. Although this conventional type of implementation has the advantage of precisely following the network layers specified in the InfiniBand™ Architecture Specification, such an arrangement requires a substantially large amount of hardware requirements. In particular, the transport layer generally requires more processing power than the link layer because the transport layer involves more complex operations. Hence, there is a need that the implementation of the transport layer in hardware does not result in a substantially complex hardware system. In addition, there is a concern with unnecessarily wasting transport layer resources on low priority operations.

According to the disclosed embodiment, link layer operations are partitioned based on the desirability to determine priorities of data packets to be transmitted. In particular, the HCA 12 of FIG. 2 includes a pre-link module configured for determining a priority of received WQEs, and a post-link module configured for preparing a data packet for transmission on the network. As described below, the pre-link module 40 orders the WQEs according to priorities determined by the pre-link module, and outputs the WQEs in the determined order to a transport service module 42 configured for generating the appropriate transport layer headers for the WQEs based on the associated queue pair attributes. In other words, the pre-link module 40 prevents the transport service module 42 from wasting resources on low priority WQEs or blocking high priority WQE's within the transport layer process. Hence, higher priority connections obtain improved service at the transport layer through the HCA.

FIG. 2 is a diagram illustrating in further detail the HCA 12 according to an embodiment of the present invention. The HCA 12, implemented for example as an application-specific integrated circuit, includes a pre-link module 40, a transport service module 42, a post-link module 44, and a media access control (MAC) module 46. The HCA 12 also has local access to a memory 48 configured for storing transport data and overflow buffers, described below.

The pre-link module 40 includes a work queue element FIFO 50, virtual lane FIFOs 52, a pre-link process module 54, a service layer to virtual lane (SL-VL) mapping table 56, a virtual lane (VL) arbitration table 58, and a virtual lane (VL) arbitration module 60.

The HCA 12 is configured for receiving data from the central processing unit 14 in the form of work queue elements (WQEs), stored in the WQE FIFO 50. Each WQE specifies a corresponding request, from a consumer application executed by the CPU 16 (i.e., "requester"), for a corresponding prescribed operation to be performed by a destination InfiniBand™ network node (i.e., "responder"), for example a target 18a. The interaction between requester and responder is specified via a queue pair (QP), where a queue pair includes a send work queue and a receive work queue.

The WQE includes service level (SL) information, and a pointer to the location of the actual message in the system memory 48. The InfiniBand™ Architecture Specification defines a service level (SL) attribute that permits a packet traversing the InfiniBand™ network 10 to operate at one of sixteen available service levels. Hence, the requester can select an available service level (e.g., quality of service, priority, etc.) based on a selected priority of the WQE.

The pre-ink module 40 provides both service level to virtual lane mapping (SL-VL mapping), and virtual lane arbitration. In particular, virtual lanes, defined in the Infini-Band™ Architecture Specification, enable multiple logical flows to be implemented over a single physical link, where link level flow control can be applied to one virtual lane without affecting other virtual lanes. The pre-link process module 54 is configured for managing and maintaining the service layer-virtual layer mapping table 56. In particular, the pre-link process module 54 retrieves a WQE from the WQE FIFO 50, and determines the corresponding virtual lane based on the service layer specified within the WQE. Upon identifying the appropriate virtual lane for the retrieved WQE, the pre-link process module 54 forwards the WQE to the corresponding virtual lane FIFO 52.

The pre-link module 40 includes virtual lane FIFOs 52a, 52b, 52c, 52d, 52e, and 52f for storage of WQEs based on the assignment by the pre-link process module 54. For example, the virtual lane FIFO 52a is used for storing WQEs associated with embedded processor operations, for example link layer control packets and handling of error conditions. In other words, when a prescribed operation is not implemented in hardware, the request is sent to an embedded processor queue 78 for further processing by an embedded processor 80, described below; hence the embedded processor 80 has its own assigned queue 52a for outputting packets into the flow of output data traffic. The virtual lane FIFO 52b is used for storing WQEs associated with management traffic. The virtual lane FIFOs 52c, 52d, 52e, and 52f are used for storing WQEs associated with respective assigned virtual lanes. Although the disclosed embodiment discloses the use of four assigned virtual lanes, additional virtual lane FIFOs may be added for additional assigned virtual lanes.

The VL arbitration module 60 is implemented as a state machine with registers, and is configured for managing the VL arbitration table 58 for servicing of the virtual lanes, including setup, management, and tear down of the virtual lanes. The VL arbitration module 60 also determines which virtual lane to service, and outputs the WQEs from the virtual lane FIFOs 52 based on the determined priority of the virtual lanes. For example, the virtual lane FIFO 52b typically stores management (high-priority) traffic, hence the VL arbitration module 60 typically would empty the virtual lane FIFO 52b before servicing the other virtual lane FIFOs 52c, 52d, 52e, or 52f. The VL arbitration module 60 would then selectively output the WQEs from the virtual lane FIFOs 52c, 52d, 52e, or 52f based on weighted priorities stored in respective weight tables within the VL arbitration table 58.

Hence, the pre-link module 40 outputs the WQEs in a prescribed order based on a determined priority of the WQEs, for example based on assigned virtual lanes, or whether the WQE is for an embedded process or management traffic.

The transport service module 42 is configured for managing transport services, including setup, management, and tear down of queue pairs. In particular, the HCA 12 includes a queue pair setup FIFO 62 configured for storing queue pair commands received from a communication agent. The communication agent is responsible for setup and tear down of transport connections: the communication agent communicates with a subnet manager to establish the transport connections (i.e., queue pairs) for the HCA 12. For example, the communication agent will determine the type of transport layer service to be used for communication, such as reliable connection service, reliable datagram service, unreliable connection service, unreliable datagram service, etc.; the communication agent will also determine a packet sequence number to be used at each end of the communication; the communication agent also will also determine what queue pair numbers are to be used for communication. For example, the local communication agent may elect to use queue pair number "10" and packet sequence number starting with "100", whereas the remote communication agent may elect to use queue pair number "100" and start the packet sequence number at "20". In addition, the communication agents at each end during connection establishment use a bypass service (described below with respect to bypass service submodule 68a), as opposed to a conventional transport layer service, to establish the transport connections.

The transport service module 42 includes a queue pair attributes database 64 and a queue pair attributes management module 66. The queue pair attributes management module 66 is configured for processing the queue pair commands in the queue pair setup FIFO 62, and updating the queue pair attributes database 64 based on the received queue pair commands. For example, the queue pair attributes database 64 stores information relating to a source queue pair number, a destination queue pair number, and possibly source agent and destination agent. Hence, the queue pair attributes database 64 will include all information necessary to support the different transport services, including reliable connection service, reliable datagram service, unreliable connection service, unreliable datagram service, and raw datagram service.

The queue pair attributes management module 66 manages the transport services by updating the queue pair attributes database 64 during communication between the local and remote communication agents, for example when packet sequence numbers increase as messages are exchanged between the local and remote communication agents.

The queue pair attributes management module 66 also includes service submodules 68, each configured for managing a corresponding transport service type based on a corresponding received WQE from the pre-link module 40. For example, the bypass service submodule 68a is configured for managing bypass services during connection establishment or managing queue pairs associated with management operations with network managers that use, for example, the raw datagram service. The CPU aided service submodule 68b is configured for managing queue pairs based on embedded processor operations using the embedded virtual lane FIFO 52a; hence, the CPU aided service submodule 68b enables coordination between the local and remote embedded processes; moreover, implementation of the CPU aided service submodule 68b in conjunction with the embedded virtual lane FIFO 52a enables messages to be retransmitted if a resend request is received from the remote communication agent. The reliable connection (RC) service submodule 68c and the unreliable connection (UC) service submodule 68d are configured for managing queue pairs associated with reliable connection and unreliable connection transport services, respectively. Although not shown, the queue pair attributes management module 66 also includes submodules 68 for managing reliable and unreliable datagram services, and raw datagram service.

Hence, the transport service module 42, upon receiving a WQE from the pre-link module 40, supplies the WQE to the appropriate submodule 68 for processing (e.g., WQE for RC service handled by the RC service submodule 68c) The WQE includes service level (SL) information, and a pointer to the location of the actual message in the system memory 48. The submodule 68, in response to reception of the appropriate WQE, parses the WQE, and retrieves from the WQE the pointer that identifies the memory location for the transport data (i.e., the payload for the transport layer); the submodule 68 performs a DMA fetch of the transport data, updates the appropriate queue pair attributes within the queue pair attributes database 64, and creates and stores in the external memory 48 a transport layer header for the WQE in a corresponding transport format; for example, the submodule 68a may generate a raw transport header, whereas the modules 68c or 68d may generate a transport header according to the reliable connection service or the unreliable connection service, respectively. The submodule 68 then creates a header pointer (p1) that identifies the location of the transport layer header. The submodule 68 then sends to the post-link module 44 the payload pointer (p2) and the header pointer (p1) as a packet request 90, enabling the postlink module 44 to assemble the transport packet for transmission based on the supplied pointers. Alternately, the submodule 68 may generate a frame pointer to a system memory location that stores the transport layer frame, including the transport layer header and the transport data. If preferred, the submodule 68 also could forward the transport layer frame (including transport layer header and transport data) to the post-link module.

The post-link module 44, in response to reception of the transport layer information (e.g., transport layer frame, packet request, etc.), fetches the transport layer header and the transport layer payload from the system memory 48 for generation of the transmit packet and storage in a transmit FIFO 70. In particular, the post-link module 44 also includes a link layer control module 72 configured for generating the transmit packet by generating link layer fields (e.g., local and global routing headers, cyclic redundancy check (CRC) fields, etc.), storage of the transmit packet in the transmit FIFO 70, and handling link layer control operations according to the InfiniBand™ Architecture Specification. Once the transmit packet has been generated, the pointers are forwarded to the free buffer manager 76, described below.

The link layer control module 72 outputs the transmit packets according to a credit-based flow control. In particular, the link layer control module 72 monitors the available credits for transmission of a transmit packet on the assignment virtual lane. In particular, credits are sent on a per virtual lane basis, where a receiver issues a credit based on packets taken from an incoming virtual lane buffer; the credits are sent to the sender, enabling the sender to manage flow control. Hence, if the link layer control module 72 determines that an identified virtual lane has an insufficient number of credits, the link layer control module 72 defers transmission of the corresponding transmit packet until a sufficient number of credits have been received. If the virtual lane has a sufficient number of credits, the link layer control module 72 forwards the transmit packet to the MAC module 46 for transmission.

The MAC module 46 is configured for outputting the transmit packet stored in the transmit FIFO 70 according to the InfiniBand™ Architecture Specification. In particular, the MAC module 46 includes a transmission module 74, a free buffer manager 76, an embedded processor input queue 78, and an embedded processor 80 having a link flow control packet construction module 82. The transmission module 74 is configured for performing media access control operations, and optionally physical layer transceiver operations, for transmission of the transmit packet onto the InfiniBand™ network 10.

The free buffer manager 76 is configured for releasing available space from the external memory 48 once the transmit packet has been successfully received by the responder. In particular, the memory pointers for a transmit packet are sent from the post-link module 44 once the transmit packet has been generated; if a responder sends a message that the transmit packet needs to be resent in a reliable connection service, the transmit packet can be regenerated by the post-link module 44 and retransmitted to the responder. Once the transmit packet is successfully received, the frame pointers can be released for use by another agent.

Flow control is handled by the embedded processor 80 based on reception of information from the embedded processor input queue 78: in particular, the flow control protocol according to the InfiniBand™ Architecture Specification uses a credit-based flow control. The embedded processor 80 generates link flow control packets using the link flow control packet construction module 82, based on messages stored into the embedded processor input queue 78. The embedded processor 80 writes the link flow control packet to external memory 48; the embedded processor 80 then generates a WQE that includes the associated operation and a pointer specifying the location of a flow control packet into the embedded processor virtual lane FIFO 52a. The link flow control packet can then be output, specifying a number of available credits for another transmitting note.

Hence, the embedded processor 80 can generate a link flow control frame including the flow control header, and output the link flow control frame to the error processor input queue 78 for transmission to the network.

According to the disclosed embodiment, link layer operations are partitioned to enable ordering of work queue entries prior to processing at the transport layer level. Hence, hardware resources, are optimized by prioritizing the work queue entries to be transmitted on the network. Moreover, use of arbitration tables and databases improves the efficiency of managing the numerous available queue pairs (up to 32 k), since a large amount of logic (or a lookup table), is no longer necessary for management of all possible queue pairs. Finally, the disclosed arrangement enables the enforcement of priorities of a packet at the transport layer, the link layer or the physical layer, as opposed to conventional approaches that only enable enforcement of the priority of the packet at link layer or the physical layer.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a host channel adapter, the method comprising:

determining an order of received work queue entries based on respective service levels, and outputting the received work queue entries according to the determined order;

generating, in a transport service module for each of the received work queue entries according to the determined order, a corresponding transport layer header for corresponding transport data specified by each of the received work queue entries;

generating transmit packets in the determined order and having the respective transport layer headers; and outputting each of the transmit packets based on the determined order.

2. The method of claim 1, wherein the determining step includes:

storing the received work queue entries in a work queue entry FIFO, each work queue entry specifying the corresponding service level;

assigning each received work queue entry stored in the work queue entry FIFO to a corresponding selected one of a plurality of virtual lane FIFOs based on a prescribed service level-virtual lane mapping; and selectively outputting work queue entries from an identified one of the virtual lane FIFOs based on a determined priority of the corresponding prescribed service level.

3. The method of claim 2, wherein the selectively outputting step includes accessing a virtual lane arbitration table to determine the priorities for the respective virtual lane FIFOs.

4. The method of claim 2, wherein the virtual lane FIFOs include an embedded processor virtual lane FIFO for embedded processor operations, the selectively outputting step including granting priority to the embedded processor virtual lane FIFO over the remaining virtual lane FIFOs.

5. The method of claim 1, further comprising:
storing, in a queue pair setup FIFO, queue pair commands received from a communication agent; and
updating a queue pair attributes database based on the received queue pair commands.

6. The method of claim 5, further comprising generating in the transport service module a management frame based on identifying a queue pair command specifying a transport service management operation.

7. The method of claim 5, wherein the step of generating a transport layer header includes accessing the queue pair attributes database for transport layer header information.

8. The system of claim 1, further comprising:
generating a header pointer that identifies a stored location of the corresponding transport layer header; and
outputting to a post-link module a packet request that specifies the header pointer and a corresponding payload pointer that specifies a stored location of the corresponding transport data.

9. A host channel adapter comprising:
a pre-link module configured for determining an order of received work queue entries based on respective service levels, the pre-link module outputting the received work queue entries according to the determined order;
a transport service module configured for generating transport layer headers for the work queue entries output from the pre-link module according to the determined order; and a post-link module configured for generating, in the determined order, transmit packets having the respective transport layer headers for output onto a network.

10. The apparatus of claim 9, wherein the post-link module outputs the transmit packets on respective assigned virtual lanes based on a determined availability of respective flow control credits.

11. The apparatus of claim 9, wherein the pre-link module includes:
a work queue entry FIFO configured for storing the received work queue entries;
a pre-link process module configured for mapping each of the received work queue entries stored in the work queue entry FIFO to a prescribed virtual lane based on the corresponding service level;
a plurality of virtual lane FIFOs, each configured for storing work queue entries assigned to the corresponding virtual lane; and
a virtual lane arbitration module configured for selectively outputting the work queue entries stored in an identified one of the virtual lane FIFOs based on a determined priority of the corresponding prescribed service level.

12. The apparatus of claim 11, wherein one of the virtual lane FIFOs is configured for storing work queue entries generated by an embedded processor, the virtual lane arbitration module granting priority to the one virtual lane FIFO.

13. The apparatus of claim 9, wherein the transport service module includes:
a queue pair attributes database configured for storing attributes of established queue pairs; and
a queue pair attributes management module configured for updating the queue pair attributes database based on received queue pair commands, and generating the transport layer header based on accessing the queue pair attributes database.

14. The apparatus of claim 13, wherein the queue pair attributes management module outputs to the post-link module a packet request that includes a header pointer specifying a stored location of the corresponding transport layer header, and a corresponding payload pointer that specifies a stored location of the corresponding transport data.

* * * * *